United States Patent [19]
Steinberg

[11] 3,810,697
[45] May 14, 1974

[54] PORTABLE FILTER EVALUATION APPARATUS

[75] Inventor: Samuel B. Steinberg, Baltimore, Md.

[73] Assignee: Air Techniques, Inc., Baltimore, Md.

[22] Filed: Aug. 10, 1972

[21] Appl. No.: 279,443

[52] U.S. Cl............................. 356/103, 356/207
[51] Int. Cl. ........................................ G01n 21/00
[58] Field of Search .......... 356/102, 103, 104, 207, 356/208; 313/315

[56] References Cited
UNITED STATES PATENTS
| | | | |
|---|---|---|---|
| 3,473,876 | 10/1969 | Steinberg | 356/103 |
| 3,515,482 | 6/1970 | Garrow et al. | 356/103 |
| 3,645,627 | 2/1972 | Brody et al. | 356/187 |
| 3,639,800 | 2/1972 | Rainone | 313/315 |

Primary Examiner—Ronald L. Wibert
Assistant Examiner—V. P. McGraw
Attorney, Agent, or Firm—Walter G. Finch

[57] ABSTRACT

Portable apparatus is provided for determining the efficiency of an air filter. The apparatus includes a particle scattering chamber through which a sample of air is passed. Light rays are directed through the chamber and reflected prticles, such as solid particles, within the air sample are sensed by a photo cell. The photo cell generates an electrical signal which is used by a pentrating meter to indicate the level of particles in the air sample. Various calibration techniques establish zero and 100% limit points and also control the intensity of the light rays during operation of the apparatus.

10 Claims, 3 Drawing Figures

PATENTED MAY 14 1974 3,810,697

PORTABLE FILTER EVALUATION APPARATUS

This invention relates generally to measuring instruments, and more particularly it pertains to apparatus and method for measuring the efficacy of air filters.

Prior devices, such as that disclosed in U.S. Pat. No. 3,473,876 to Steinberg, use a particle-scattering chamber with a light reflecting system to determine particle level in a sample of air passing through the chamber. The sample of air is drawn through a probe which is placed, at different times, on opposite sides of a filter in a conduit system to test the efficacy of the filter. A light source is used to provide the light rays.

In order to obtain variations in the sensitivity of the readings of the system, various ranges of operation are provided for the device. If a highly sensitive reading is desired because of low particle content, the level of illumination within the scattering chamger is reduced by inserting a filter into the scattering chamber. Other filters are inserted for other sensitivity levels. The insertion of the filters into the scattering chamber is controlled electrically when a meter switch is positioned selectively for the various available ranges of the apparatus.

Thus, the intensity of the lamp of the light source remains at a constantly high level which tends to reduce the life of the lamp and also requires consistently higher power for operation. The consistent use of higher power is obviously costly. Therefore, there is a need for a system which will eliminate the continuous high powered use of the lamp while still providing sufficient light-ray intensity for accomplishing the filter evaluation.

Further, after the upper limit of the range selection has been set by a time-consuming calibration procedure, the sensitivity capability of the system tends to drift so that inaccurate readings may occur. The system must then be recalibrated by the time-consuming procedure. Consequently, there exists a need for an internal calibration technique which can be rapidly conducted to maintain the system in readiness for accurate readings.

Also stray light and stray signals can affect the operation of the system to the extent the erroneous readings could be displayed.

It is an object of this invention to provide a simple portable particulate detection instrument which can be set up easily and conveniently to test air filters in situ.

Another object of this invention is to provide a light-intensity control for establishing various intensity levels when it is desired to vary the sensitivity of the filter evaluation.

Still another object of this invention is to provide an internal calibration system for a filter efficiency detection instrument. A further object of this invention is to provide a compensation adjustment feature for compensating for stray light and stray signals in the operation of a light-reflective, light-responsive particulate detection instrument used in evaluating air filters.

The present invention contemplates a portable type of measuring equipment which is brought to the site of the filter, and, using the normal air flow of the system in which the filter is used, a direct reading of filter efficiency can be taken quickly to determine whether it is necessary to replace the filter.

Other objects and attendant advantages of this invention will become more readily apparent and understood from the following detailed specifications and accompanying drawings in which.

Figure 1:
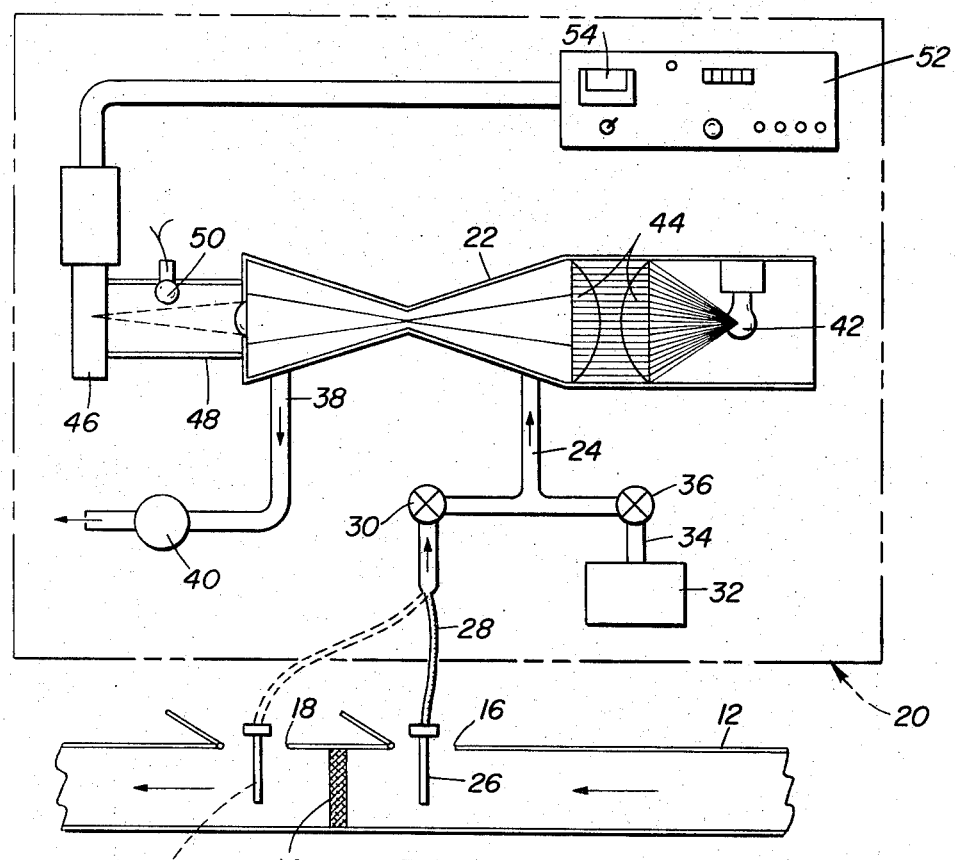
FIG. 1 is a schematic diagram of a portable particulate detection apparatus incorporating features of this invention.

Referring now to the details of the drawings and particularly to FIG. 1, there is shown an air system duct 12 having a filter 14, the efficiency of which is to be evaluated. The duct 12 is provided with two portals 16 and 18, on the upstream and downstream sides, respectively, of the filter 14.

A portable, particulate-detection, filter-evaluation apparatus 20 is enclosed in a suitcase-type housing (not shown) with cover, latches and carrying handle for easy portability.

The apparatus 20 includes a scattering chamber 22 which receives samples of air from an inlet conduit 24. A sampling probe 26 is connected to a flexible tube 28. The tube 28 is connected to a solenoid-controlled valve 30 which is controllable to direct a sample of air from the probe 26 into the conduit 24.

An absolute air filter 32 is located at one end of a conduit 34 which is connected to a solenoid-controlled valve 36. The valve 36 is controllabe to direct air, which passes through the filter 32, into the conduit 24.

An outlet conduit 38 is connected between the scattering chamber 22 and a vacuum pump 40 which draws the air sample either from the probe 26 or the air filter 32 depending on the position of the valves 30 and 36, respectively.

A lamp 42 directs light rays through an optical filter system 44 and into the scattering chamber 22. Particles in the air samples reflect the light rays which are sensed by a photo multiplier tube 46 as a direct indication of the particle-level in the air sample. The photo tube 46 is of a type commonly referred to as a 913A photo multiplier tube. The reflected rays are directed and focused through a tube 48 which also supports a calibration lamp 50. The photo tube 46 develops an electrical signal which is coupled to an amplifier and penetration indicator unit 52.

Briefly, in a calibration procedure, a known test aerosol is injected into the air flow of the duct 12. The probe 26 is inserted into the upstream side of the duct 12 with respect to the filter 14. The valve 30 is opened and the valve 36 is closed. The vacuum pump 40 draws a sample of the test-aerosol air from the probe 26 and through the scattering chamber 22. Since the probe 26 is in the upstream portion of the duct 12, the air is unfiltered and the particulate level is at its highest. This represents a condition wherein the sample of air contains a particulate level of 100 percent. A current meter M1, which is within the unit 52 and is provided with a scale to read percentage, is adjusted to indicate a 100, or upper limit, reading.

Thereafter the valve 30 is closed and the valve 36 is opened so that the sample of clean air is now drawn through the absolute filter 32 and the scattering chamber 22. This particulate level represents essentially a zero, or lower lever, reading. An adjustment is made so that the zero reading is indicated on the meter M1. It is noted that the probe 26 could be withdrawn from the duct 12 and an absolute filter placed over the probe. The air drawn through the probe 26 is now clean air and could be used for the zero-reading adjustment of the calibration procedure instead using the arrangement with the absolute filter 32. Thus the upper and lower limits have been established.

After calibration of the system, the probe 26 can then be inserted into the duct 12 on the downstream side of the filter 14 and the particulate content of the air sample indicates the efficiency of the filter 14 by operating the meter M1, which has been calibrated, to display the evaluation directly in percentage terms. Thus, the amount of contaminate particulate material which the filter 14 allows to penetrate through the filter is indicated in percentage.

Figure 2:
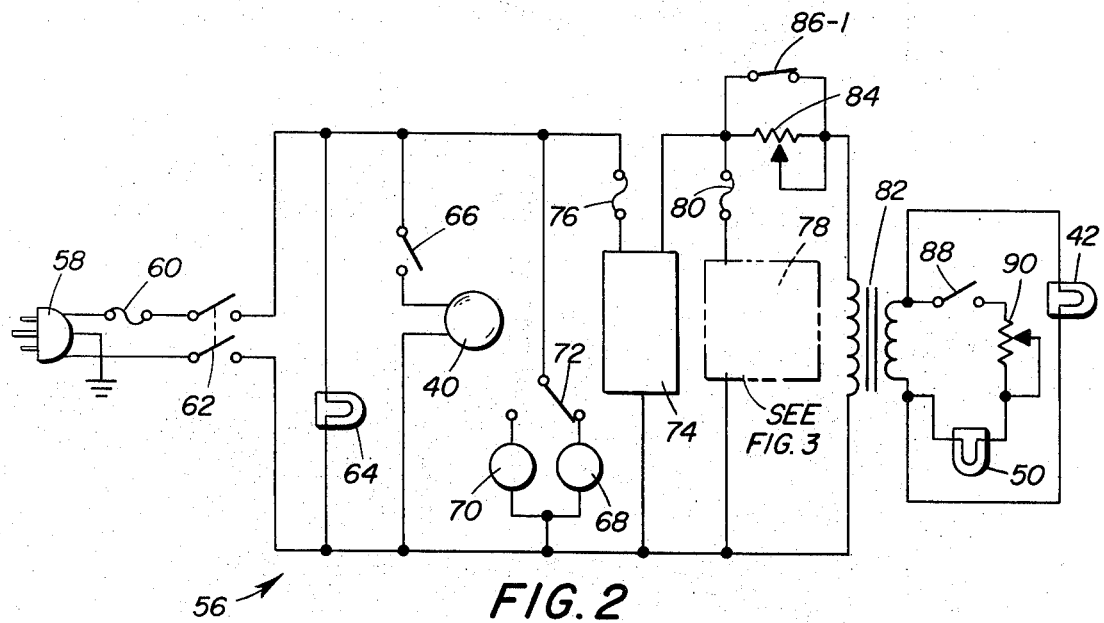
FIG. 2 is an electrical diagram of electrical control facilities of the detection apparatus of FIG. 1.

The electrical diagram of FIG. 2 illustrates a circuit 56 whereby the apparatus is powered through household power by a three-prong, grounded plug 58 and is protected by a fuse 60. A double pole switch 62 connects power to the circuit 56. The circuit 56 includes a power-on lamp 64 and the vacuum pump 40 which is connectable to the input power by a switch 66. Solenoids 68 and 70 are operated separately by a switch 72 and control the valves 30 and 36, respectively.

A constant voltage source 74 is connected through a fuse 76 to the input power and provides a source of constant voltage for an amplifier and indicator circuit 78 through a fuse 80. The primary of a transformer 82 is also supplied power by the source 74 through either a current-limiting rheostat 84 or, at selected times, through a relay contact 86–1.

The secondary of the transformer is connected to the lamp 42 in one circuit and to the calibration lamp 50 in another circuit. The calibration lamp 50 is connected in series with a switch 88 and a current-limiting rheostat 90. During a calibrating period, the switch 88 is closed and the rheostat 90 is adjusted to set the intensity level of the lamp 50 so that the photo tube 46 can be recalibrated when needed. The recalibration feature will be explained later in detail.

Figure 3:
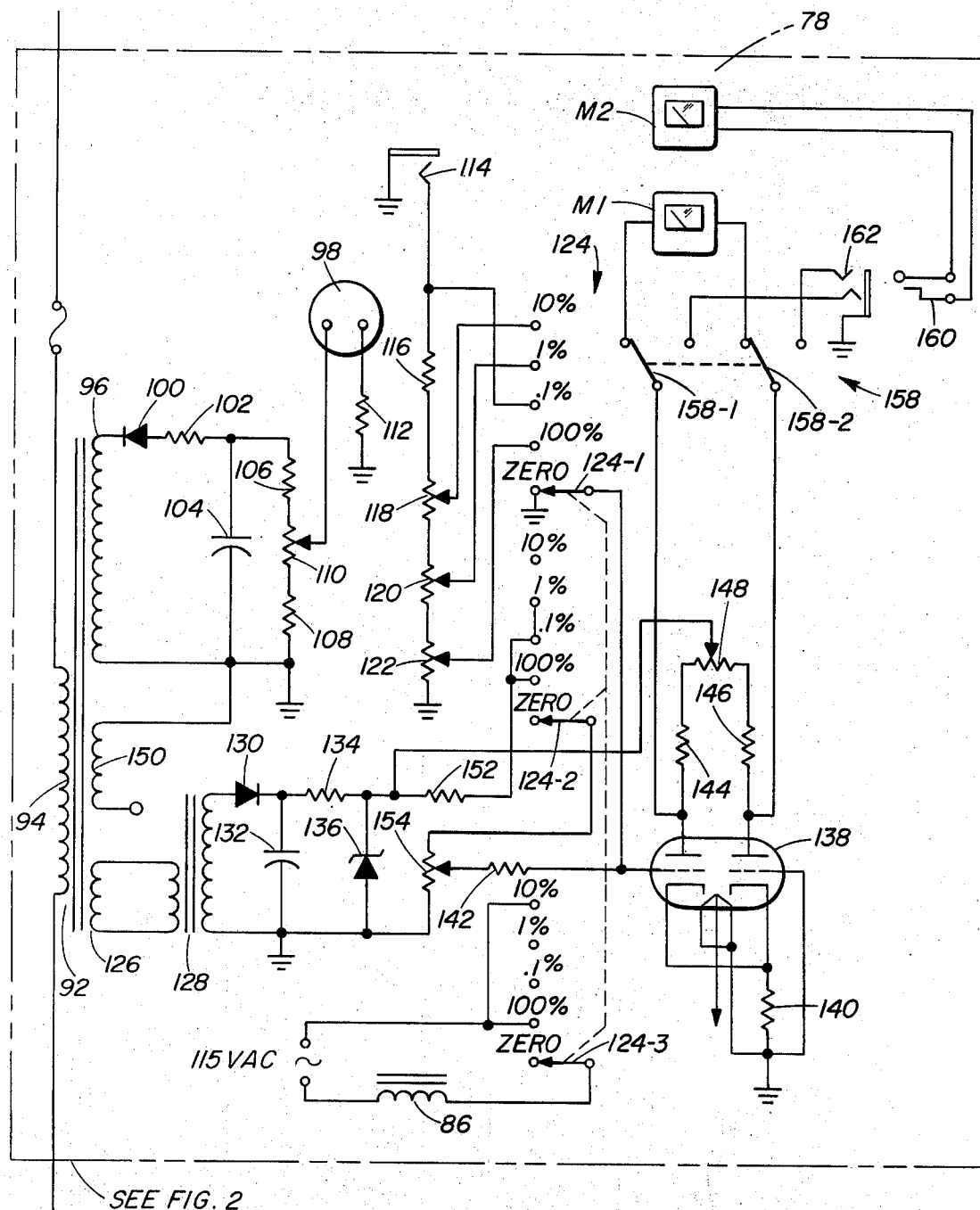
FIG. 3 is an electrical diagram of an amplifier-meter circuit of the detection apparatus of FIG. 1.

The amplifier and indicator circuit 78 is illustrated in detail in FIG. 3 and includes an input transformer 92 having a single primary 94. A secondary 96 of the transformer 92 facilitates the applying of a negative voltage to the input 98 the photo tube 46. The secondary 96 is connected to a rectifying diode 100, a filtering resistor 102 and capacitor 104 and a voltage divider network including resistors 106 and 108 and a potentiometer 110. The adjusting arm of the potentiometer 110 is connected to one terminal of the input 98 of the photo tube 46 while the other terminal is connected to a resistor 112 which is connected to ground.

The output of the photo tube 46 is connected to the circuit 78 through a receptacle 114. The receptacle 114 is connected to a series circuit of a fixed resistor 116 and potentiometers 118, 120 and 122. The adjusting arms of the potentiometers 118, 120 and 122 are each connected to one of a set of five contacts which forms a portion of three sets of five contact of a range selector switch 124 having three gang-connected contact arms 124–1, 124–2 and 124–3.

The five contacts of each set of the switch 124 are labelled as ZERO, 100 percent, .1 percent, 1 percent and 10 percent and indicate the various sensitivity settings for evaluating the efficiency of the filter 14.

The circuit 78 also includes a positive power source which derives initial power through another secondary 126 of the transformer 92. The secondary 126 is connected to the primary of a transformer 128. The secondary of the transformer 128 is connected to a rectifying and voltage regulating circuit which includes a rectifying diode 130, a filtering capacitor 132, a current-limiting resistor 134 and zener diode 136 which regulates the voltage to provide a constant positive voltage at the output of the regulating circuit.

The circuit 78 further includes a dual triode tube 138 such as one commonly referred to as a 12AU7A tube. The cathodes of the two sections of the tube 138 are connected together and through a resistor 140 to ground. The grid of the right section of the tube 138 is connected to ground while the other grid is connected to a resistor 142 and the arm 124–1 of the switch 124. A pair of resistors 144 and 146 and a potentiometer 148 are connected in series and between the plates of the tube 138. The filaments of the tube 138 are connected commonly to ground and to one side of another secondary 150 of the transformer 92.

The center arm of the potentiometer 148 is connected to one side of the zener diode 136. The same side of the zener diode 136 is also connected through a resistor 152 to the three contacts labelled 1 percent, .1 percent and 100 percent of the middle set of contacts of the switch 124. The other side of the zener diode 136 is connected to a potentiometer 154 which is further connected to the contact arm 124–2. The center arm of the potentiometer 154 is connected to the resistor 142. In addition, the contact labelled .1 percent in the upper set of contacts is connected between the receptacle 114 and the resistor 116.

A coil 86 of the relay which is associated with the relay contact 86–1 (FIG. 2) is connected to one side of an AC power source and to the contact arm 124–3. The other side of the power source is connected to the contacts labelled 10 percent and 100 percent of the lower set of contacts of the switch 124.

The current meter M1 is connected through contact arms 158–1 and 158–2 of a switch 158 to the plates of the tube 138. The biasing of the tube 138 through cathode and grid biasing and and the setting of the center arm of the potentiometer 148 establish conditions which could cause a difference of potential to exist between the two plates of the tube whereby current flows through the meter M1 to indicate a particular condition such as the percentage of particulate material in the sample of air.

Another current meter M2 is attached to a portion of the probe 26 and is connected to a plug 160. A receptacle 162 is connected to another set of contacts of the switch 158. If the plug 160 is inserted into the receptacle 162 and the switch 158 is controlled to place the contact arms 158–1 and 158–2 to the left, the meter M2 will display the percentage reading rather than the meter M1 displaying the reading. This permits an operator to view the results of the evaluation at a point removed from the housing which contains the bulk of the equipment and particularly permits the operator to view the results in the vicinity of the probe 26.

In a procedure to electronically balance the system to a zero reading, the range selector switch 124 is controlled to place the contact arms 124–1, 124–2 and 124–3 on the ZERO contacts. The switch 158 is positioned to connect the meter M2 in the circuit 78. The switch 72 is controlled to open valve 36 and close valve 30 when the power is turned on so that air can be drawn through the absolute filter 32. Switches 62 and 66 are then closed so that power is applied to the circuit 56, the vacuum pump 40 is operated and the lamp 42 is turned on.

This places the left grid of the tube 138 at ground. Since the other grid of the tube 138 is already at ground, the potentiometer 148 is adjusted to balance the conduction level of the two sections of the tube so that no current flows through the meter M1. Thus the circuit 78 is balanced for a zero meter reading and the circuit 78 is electronically balanced.

To set the upper limit of the system for the 100 percent or least sensitive sensitivity setting, the switch 124 is moved to place the contact arms 124-1, 124-2 and 124-3 on the 100 percent contacts. The contact arm 124-1 connects the center arm of the potentiometer 122 to the grid of the left section of the tube 138. The contact arm 124-2 connects the resistor 152 in series with the potentiometer 154 and across the regulated positive voltage developed across the zener diode 136. The center arm of the potentiometer 154 is also connected to the grid of the left section of the tube 138 which biases the tube so that the different sections of the tube conduct at different levels. The switch 72 is controlled to permit the sample of air to be drawn through the probe 26. The test aerosol is injected into the air flow system of the duct 12 as previously noted and the probe 26 is inserted through the portal 16 and into the upstream side of the duct. Since this upstream of the filter 14, the air sample contains the highest content of particulate material. To insure that the meter M1 reads 100 percent, the potentiometer 110 is adjusted to preset the level of the negative potential applied to the photo tube 46 so that the upper limit of the meter is established at the 100 percent reading.

In order to eliminate the undesirable effects of stray light or stray electronic signals on the detection system, the switch 72 is then positioned to facilitate the drawing of the air sample through the absolute filter 32. The range selector switch 124 is positioned to the most sensitive position of the 1 percent setting. The potentiometer 154 is then adjusted to alter the bias on the grid of the left section of the tube 138 until the meter M1 reads zero. During a filter evaluation procedure, this preset adjustment compensates for any stray light or stray electronic signals which might result in an undesirable signal being sensed by the photo tube 46 and thereby resulting in the display of an erroneous percentage reading on the meter M1.

Due to inherent features of the components of the system, the intensity setting for 100 percent may drift to such an extent that periodic recalibrations may be required. As noted previously, this involves a time-consuming procedure using the test aerosol and movement of the probe 26 between upstream and downstream sections of the duct 12.

To eliminate the necessity for such a time-consuming recalibration procedure, an internal calibration adjustment is included by use of the lamp 50.

Immediately after the system has been initially calibrated for the 100 percent reading, the internal calibration setting is established whereby the switch 72 is positioned to draw the air sample through the absolute filter 32. The range selector switch 124 is set to the .1 percent setting. The switch 88 (FIG. 2) is closed and the rheostat 90 is adjusted to swthes the intensity of the calibrate lamp 50 until the meter M1 reads "100".

During subsequent checks of the accuracy of the detection of the photo tube 46, the switches 72, 88 and 124 are set to the same position as they were in the internal calibration setting. If the meter M1 does not read "100", the potentiometer 110 is adjusted until the "100" reading is obtained thereby recalibrating the system. Thus, only a few switches are set and a potentiometer adjusted to recalibrate the system rather than the need for going through the entire procedure need for the initial calibration.

When the range selector switch 124 is placed on the less sensitive settings of 10 percent and 100 percent, it is desirable to reduce the intensity of the lamp 42. In the past, solenoid-controlled light filters were mechanically inserted into the scattering chamber. A more efficient system requiring less space and equipment in the present device 20 eliminates the need for light filters.

This system is operated when the contact arm 124-3 completes a circuit to apply operating energy to the coil 86. The contact 86-1 (FIG. 2) is thereby opened to effectively place the rheostat 84 in series with the primary of the transformer 82. By adjusting the rheostat 84 to a selected level, the current flow through the primary of the transformer 82 is reduced to effectively reduce the intensity of the lamp 42 during the 100 percent range reading. The rheostat 84 can be adjusted after it has been placed in the circuit by providing a control knob on an external portion of the unit 52 (FIG. 1) with markings adjacent to the knob to indicate the 100 percent and 10 percent range selections. Since these are the only two ranges where the lamp intensity is reduced, the other two ranges need not be indicated adjacent to the extenal control knob.

When the photo tube 46 develops a potential in response to the light reflected by the particles of the sample of air, current flows through the resistor 116 and the potentiometers 118, 120 and 122 whereby the left section of the tube 138 is further biased to cause current flow through the meter M1 to indicate the percentage of particulate material in the air sample and, consequently, the efficiency of the air filter 14.

The remaining range selections function in a similar manner with variations in the biasing of the left section of the tube 138 depending upon the particular sensitivity range selected and the detected reflected light on the particles.

Significantly, the use of the relay coil 86 and contact 86-1 in conjunction with the rheostat 84 permits selective control of the intensity of the lamp 42 for use at the different ranges. This eliminates the need for a mechanical light filter system within the scattering chamber 22 and for a sophisticated control mechanism to control such a mechanical filter system.

Obviously many modifications and variations of the present invention are possible in light of the above teachings. It is, therefore, to be understood that within the scope of the appended claims the invention may be practiced otherwise than as specifically described.

What is claimed is:

1. Apparatus for measuring the level of particle content in a sample of air to determine the efficiency of an air filter located in an air flow system from which the sample is taken, comprising, means for scattering particles contained within air samples being passed therethrough, probe means insertable into areas from which samples of air are to be drawn, means for drawing samples of air through said probe means and said scattering means, a light source positioned adjacent said scattering means to direct light rays onto air-sample particles being scattered in said scattering means, light-responsive signal-generating means positioned adjacent said scattering means and being responsive to the light reflected from said air-sample particles being scattered in said scattering means to develop a signal the level of which is indicative of the particle content in said air sample, means for indicating the level of particle content in said air sample, circuit means responsive to the signal developed by the light-responsive means for controlling the indicating means to indicate the particle-content level, and means for adjusting the circuit means to compensate for any incidental light sensed by the light-responsive means and emanating from a source other than the reflected particles and for any stray electronic signal which would cause and erroneous on the indicating means.

2. The apparatus of claim 1 wherein the circuit means includes a tube having at least one grid, said tube being biased to control the indicator means in response to the signal generated by the light-responsive means, and the adjusting means includes a presettable regulated potential source which is adjusted when essentially particle-free air is being drawn through the scattering means to set the indicating means to a zero reading even though incidental light and stray electronic signals may be sensed by the light-responsive means.

3. The apparatus of claim 1 and additionally means for initially adjusting the sensitivity of the light-responsive means to control the indicating means to read an upper limit when the air sample has essentially maximum particle content, and another light source presettable at an intensity comparable to the initially adjusted sensitivity of the light-responsive means for providing an internal standardized light-intensity reference for subsequent calibration of the light-responsive means to a condition simulating an air sample having essentially maximum particle content.

4. The apparatus of claim 1 wherein said circuit means includes means for selectively operating the apparatus at any one of a plurality of sensitivity levels, and said apparatus additionally comprising means for controlling the light source in response to selective operation of said apparatus at least at the lowest of said sensitivity levels to reduce the intensity of the light from the light source.

5. The apparatus of claim 4 wherein said light-source controlling means includes an adjustable power source connectable to said light source automatically when said operating means is selectively set to operate the apparatus at least at the lowest sensitivity level.

6. The apparatus of claim 3 wherein said circuit means includes means for selectively operating the apparatus at any one of a plurality of sensitivity levels, and said apparatus additionally comprising means for controlling the light source in response to selective operation of said apparatus at least at the lowest of said sensitivity levels to reduce the intensity of the light from the light source.

7. Apparatus for measuring the level of particle content in a sample of air to determine the efficiency of an air filter located in an air flow system from which the sample is taken, comprising, means for scattering particles contained within air samples being passed therethrough, probe means insertable into areas from which samples of air are to be drawn, means for drawing samples of air through said probe means and said scatterg means, a light source positioned adjacent said scattering means to direct light rays onto air-sample particles being scattered in said scattering means, light-responsive signal-generating means positioned adjacent said scattering means and being responsive to the light reflected from said air-sample particles being scattered in said scattering means to develop a signal the level of which is indicative of the particle content in said air sample, means for indicating the level of particle content in said air sample, circuit means responsive to the signal developed by the light-responsive means for controlling the indicating means to indicate the particle-content level, means for initially adjusting the sensitivity of the light-responsive means to control the indicating means to read an upper limit when the air sample has essentially maximum particle content, and another light source presettable at an intensity comparable to the initially adjusted sensitivity of the light-responsive means for providing an internal standarized light-intensity reference for subsequent calibration of the light-responsive means to a condition simulating an air sample having essentially maximum particle content.

8. The apparatus of claim 7 wherein said circuit means includes means for selectively operating the apparatus at any one of a plurality of sensitivity levels, and said apparatus additionally comprising means for controlling the light source in response to selective operation of said apparatus at least at the lowest of said sensitivity levels to reduce the intensity of the light from the light source.

9. Apparatus for measuring the level of particulate content in a sample of air to determine the efficiency of an air filter located in an air flow system from which the sample is taken, comprising, means for scattering particles contained within air samples being passed therethrough, probe means insertable into areas from which samples of air are to be drawn, means for drawing samples of air through said probe means and said scattering means, a light source positioned adjacent said scattering means to direct light rays onto air-sample particles being scattered in said scattering means, light-responsive signal-generating means positioned adjacent said scattering means and being responsive to the light reflected from said air-sample particles being scattered in said scattering means to develop a signal the level of which is indicative of the particle content in said air sample, means for indicating the level of particle content in said air sample, circuit means responsive to the signal developed by the light-responsive means for controlling the indicating means to indicate the particle-content level, said circuit means including means for selectively operating the apparatus at any one of a plurality of sensitivity levels, and means for controlling the light source in response to selective operation of said apparatus at least at the lowest of said sensitivity levels to reduce the intensity of the light from the light source.

10. The apparatus of claim 9 wherein said light-source controlling means includes an adjustable power source connectable to said light source automatically when said operating means is selectively set to operate the apparatus at least at the lowest sensitivity level.

* * * * *

UNITED STATES PATENT OFFICE
CERTIFICATE OF CORRECTION

Patent No. 3,810,697　　　　　　　Dated　May 14, 1974

Inventor(s)　Samuel B. Steinberg

It is certified that error appears in the above-identified patent and that said Letters Patent are hereby corrected as shown below:

Column 7, line 20, after "erroneous" insert -- signal to be generated capable of causing an erroneous reading --. Column 8, line 5, "scatterg" should read -- scattering --.

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents

Disclaimer 3,810,697.—*Samuel B. Steinberg*, Baltimore, Md. PORTABLE FILTER EVALUATION APPARATUS. Patent dated May 14, 1974. Disclaimer filed Nov. 19, 1974, by the assignee, *Air Techniques, Inc.*

Hereby enters this disclaimer to claims 1–10 of said patent.

[*Official Gazette December 16, 1975.*]